Jan. 27, 1953   J. W. DAWSON   2,626,430
VULCANIZING

Filed Aug. 10, 1946   2 SHEETS—SHEET 1

INVENTOR
JOHN W. DAWSON
BY Elmer J. Gorn
ATTORNEY

Jan. 27, 1953        J. W. DAWSON        2,626,430

VULCANIZING

Filed Aug. 10, 1946        2 SHEETS—SHEET 2

INVENTOR
JOHN W. DAWSON
BY
ATTORNEY

Patented Jan. 27, 1953

2,626,430

UNITED STATES PATENT OFFICE 2,626,430

VULCANIZING

John W. Dawson, West Newton, Mass., assignor to Raytheon Manufacturing Company, Newton, Mass., a corporation of Delaware Application August 10, 1946, Serial No. 689,728

6 Claims. (Cl. 18—48)

This invention relates to vulcanizing, and more particularly to the heating or curing of uncured or unvulcanized rubber by means of mechanical manipulation.

An object of this invention is to devise a novel method of heating uncured rubber.

Another object is to provide apparatus by means of which an uncured or unvulcanized region of a rubber body may be selectively heated.

A further object is to devise apparatus by the use of which the deeper portions of a rubber tire patch may be readily and effectively heated.

A still further object is to provide means for curing rubber by the use of which uniform curing of the surface and deeper portions of the rubber body may be realized.

Another object is to devise novel apparatus for heating uncured or unvulcanized rubber.

The foregoing and other objects of the invention will be best understood from the following description of some exemplifications thereof, reference being had to the accompanying drawings, wherein.

Figures 1, 2:
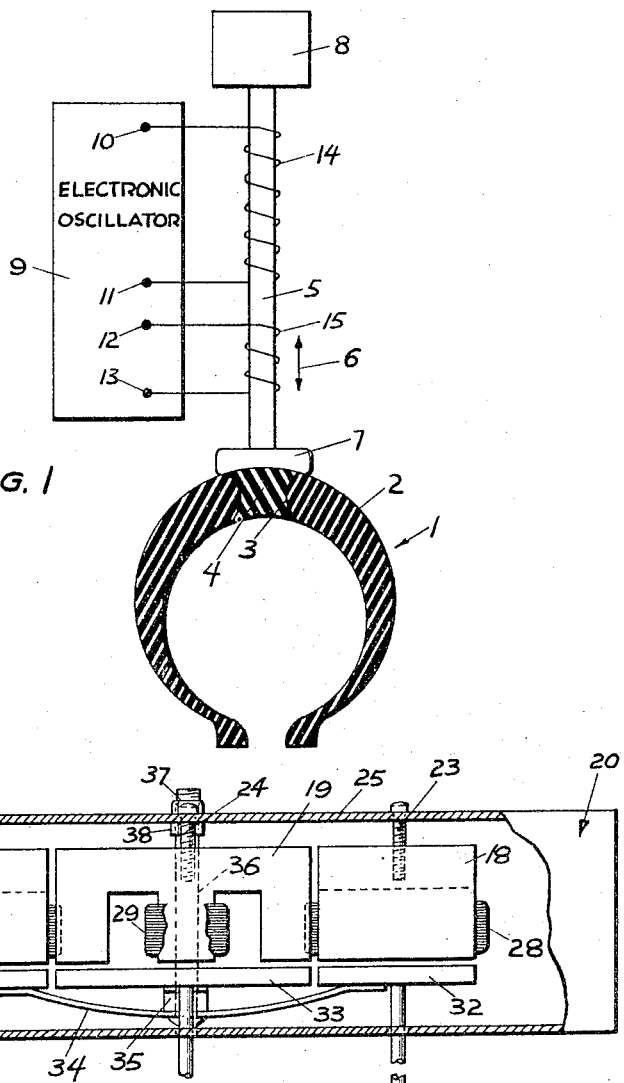
Fig. 1 is a schematic representation of one means for carrying out the invention.
Fig. 2 is an elevation, partly broken away, of a modified apparatus.

Referring, now, to the drawings, and particularly to Fig. 1 thereof, a rubber body to be patched is shown at 1; this body may be, for example, a pneumatic rubber tire, such as those commonly used on automobiles. The main portion 2 of said body is composed of vulcanized or cured rubber, which is quite resilient. A hole 3 in body 1 is filled with a body or mass 4 of patching material, which is uncured or unvulcanized rubber having a plastic putty-like consistency; this mass 4 may be thought of as a viscous fluid or a dough-like mass. An elongated rod 5 of magnetostrictive material, which has a suitable natural mechanical resonant frequency, is mounted for longitudinal vibrations or movements in the directions indicated by the arrows 6. Attached to one end of rod 5 is a battering head 7, which has a face adapted to contact body 4, said face being of any suitable shape which is good for kneading purposes; attached to the opposite end of rod 5 is an inertia mass 8.

Rod 5 is vibrated longitudinally at its natural resonant frequency by means of an electronic oscillator having a pair of output terminals 10 and 11 and a pair of feed-back or frequency control terminals 12 and 13. A driving coil 14, inductively related to rod 5, is connected across the plate or output terminals 10 and 11 of the oscillator, while a pickup coil 15, also inductively related to rod 5, is connected across the grid or control terminals 12 and 13 of the oscillator. By utilizing a pick-up coil 15 as shown, the output frequency of oscillator 9 is automatically maintained equal to the natural resonant vibratory frequency of rod 5, by the feedback, to the grid of the oscillator tube, of a voltage having a frequency equal to said natural resonant vibratory frequency.

The energy content of the compressional waves or mechanical vibrations applied to the body 4 must be sufficiently high to produce heating of said body. In other words, the energy applied to the body 4 to be heated must be of sufficiently high cyclical intensity to cause the transfer to said body of sufficient total energy to produce substantial heating thereof. Although the natural resonant frequency of rod 5 may be within either the sonic or the supersonic ranges, a frequency within the supersonic range is preferred because, for any certain cyclical intensity level of energy, the rate of energy transfer per unit volume of the body is greater with a supersonic frequency than with a sonic frequency, so that the total energy transferred to the body per unit of time is greater for supersonic than for sonic frequencies.

In operation, compressional waves, or mechanical vibrations, having the frequency of oscillator 9, are applied to body 4 by means of vibrating rod 5 and battering head 7. It has been found that in vulcanized rubber, which is resilient, relatively low absorption of energy (and therefore also negligible heating) results when the specimen is subjected to tension and compression. However, in the case of unvulcanized or uncured rubber, which has a putty-like or dough-like consistency, a large proportion of the mechanical energy applied is absorbed by the material, appearing as heat in the material. When the rod 5 moves to the right in Fig. 1, body 4 is compressed and is forced to flow outwardly against the boundaries of hole 3, the resilient material 2 at the sides of said hole yielding to a certain extent. During the next half-cycle of oscillator 9, rod 5 moves to the left, and during this time the natural resilience of material 2 causes it to tend to resume its original position, compressing body 4 at the sides thereof and forcing it to flow in the direction of movement of rod 5. This resilient action of the surrounding material 2 is quite important and materially assists in the overall kneading effect applied to body 4. As body 4 is repeatedly and rapidly kneaded in the manner described, it absorbs energy, said energy appearing as heat in said body, this heat serving to vulcanize or cure the rubber of body 4.

Due to the fact that energy absorption or losses are relatively low in the vulcanized resilient rubber 2 as compared with those in the unvulcanized or uncured plastic rubber 4, heating will be produced selectively and beneficially in the uncured or unvulcanized regions of the tire to which the compressional waves are applied; this means that energy will first be applied to the new unvulcanized material and that, as this material vulcanizes and becomes resilient, the losses therein will be automatically diminished, so therefore the losses or the energy absorption (and therefore also the heating) will be even more localized in the remaining uncured portions of the patch. As a result, the uncured or unvulcanized region of the rubber body is selectively heated, even though mechanical movements or vibrations may be applied to the vulcanized regions also.

Even though the mechanical energy is applied to the outer surface of the body 4 in contact with head 7, deeper portions of the raw rubber 4 of the patch may be readily and effectively heated, to give uniform curing of the surface and deeper portions of body 4. When the outer regions of body 4 become cured, they become more resilient, so that energy absorption therein is reduced, this resilience allowing the transfer of energy into the deeper portions of the patch body. Therefore, all of the patch body 4 will be substantially uniformly heated and vulcanized or cured, almost to the exclusion of any heating of the vulcanized portion 2.

Figure 3:
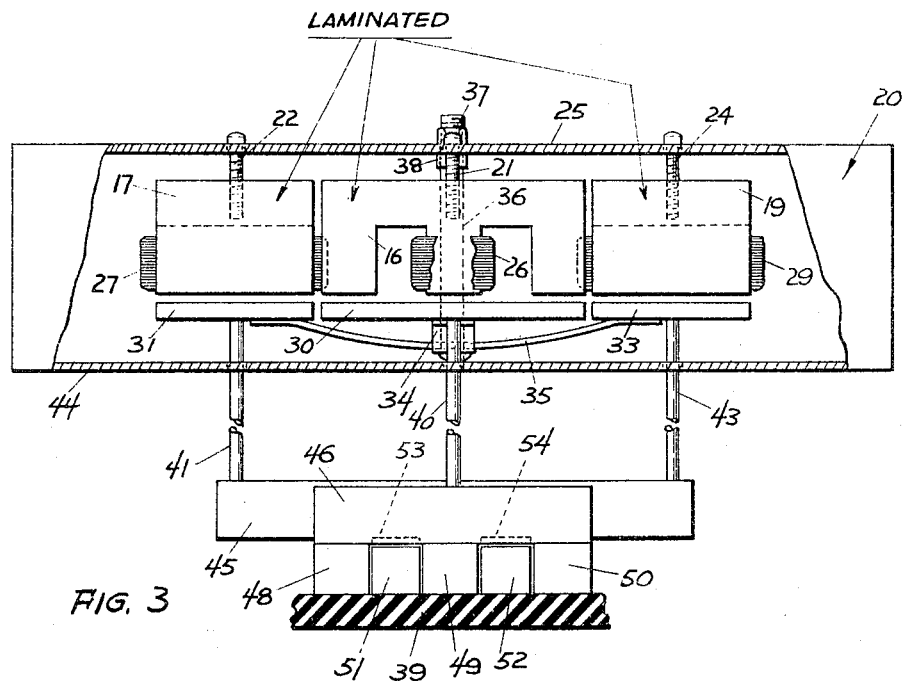
Fig. 3 is a side view, partly broken away, of the apparatus of Fig. 2.
Figure 4:
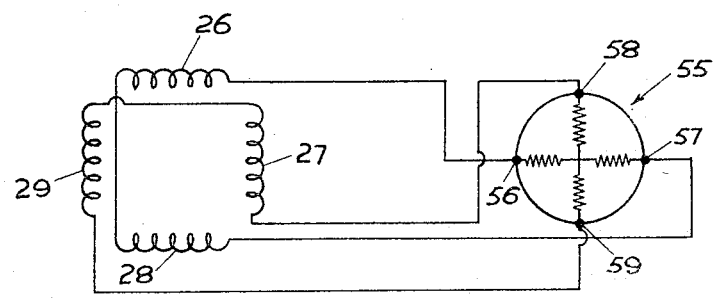
Fig. 4 is a wiring diagram of the apparatus of Fig. 2.

Figs. 2-4 show a modification of the tire vulcanizing apparatus of this invention, particularly suitable for the vulcanizing of large bodies of rubber. Four magnetic structures 16, 17, 18, and 19 are rigidly mounted inside a hollow casing 20, as by means of bolts 21, 22, 23, and 24, respectively, said bolts extending through apertures in the top 25 of casing 20 and into tapped openings in the respective magnetic structures. Structures 16-19 are all preferably laminated and each consists of a three-legged core of magnetic material opening downwardly; structures 16 and 18 are spaced from each other, are parallel to each other, and are positioned, respectively, near opposite edges of top 25 to form one pair of structures, while structures 17 and 19 are turned at right angles with respect to pairs 16 and 18, structures 17 and 19 being spaced from each other, being parallel to each other, and being positioned, respectively, near the remaining opposite edges of top 25 to form a second pair of structures. A separate coil is wound around the center leg of each of the cores or structures 16-19, these coils being shown at 26, 27, 28, and 29, respectively.

Four plates or mass members 30, 31, 32, and 33 are provided, each plate being of substantial thickness and made of magnetic material; the four plates are each of the same cross-sectional area as the cores and one plate is positioned adjacent each respective one of the four cores, the plates being separated from the corresponding cores by small air gaps. In order to resiliently maintain the plates 30-33 in position, there are provided two leaf springs 34 and 35, which are firmly fastened together at their central portions, where they cross each other at right angles, with spring 34 above spring 35. The two ends of spring 34 are firmly attached, as by welding, to opposite plates 30 and 32, while the two ends of spring 35 are firmly attached to opposite plates 31 and 33. One end of a stud bolt 36 is rigidly attached, as by welding, to the springs 34 and 35 at the point where they cross each other and the other end of said bolt passes through an opening in the center of top 25, said bolt being held in fixed position with respect to said top by means of a pair of lock nuts 37 and 38 which threadedly engage said bolt, one on the inside and one on the outside of top 25. From each end to the middle of each spring, said springs are bowed downwardly, so that, when each of the electromagnetic cores is energized by the application of a current to its coil, the corresponding plate will be attracted toward the core, placing the spring to which this plate is attached under compression; when the core is deenergized, the plate will be returned to its original position by said spring.

In order to transmit the movements of plates 30-33 to the body of uncured rubber 39 to be mechanically manipulated and thereby heated to vulcanizing or curing temperature, four elongated rods 40-43 are provided, one of these rods being rigidly attached, as by welding, to the center of the lower surface of each of plates 30-33, and the rods passing freely through corresponding apertures provided in the bottom 44 of casing 20. Rods 41 and 43 are rigidly attached, at their lower ends, to opposite ends of an elongated pressure member 45; the lower end of rod 40 is attached rigidly to the central portion of a pressure member 46 and the lower end of rod 42 is attached rigidly to the central portion of a similar pressure member 47, members 46 and 47 being somewhat shorter than member 45, parallel thereto, and spaced equidistantly therefrom on opposite sides thereof.

Three spaced elongated fingers 48, 49 and 50 extend between members 46 and 47, one end of each of said fingers being rigidly secured to member 46 and the opposite end of each of said fingers being rigidly secured to member 47, the fingers being attached to the lower surfaces of members 46 and 47 and extending at right angles to the direction of the lengths of said members. The lower surfaces of fingers 48, 49, and 50 are adapted to be placed in direct contact with rubber body 39; it will therefore be apparent that mechanical movements of plates 30 and 32 will be applied, through rods 40 and 42, pressure members 46 and 47, and fingers 48-50, to body 39.

Two spaced elongated fingers 51 and 52, which have the same length as fingers 48-50, extend parallel thereto, finger 51 lying in the space between fingers 48 and 49, and finger 52 lying in the space between fingers 49 and 50. Fingers 51 and 52 are of slightly smaller cross-sectional area than fingers 48-50, and are spaced from the adjacent surfaces of fingers 48-50 and of pressure members 46 and 47, so as to allow for independent movement of the two groups of fingers, 48-50 and 51—52. Fingers 51 and 52 are each provided with a boss or thickened portion in the central region of their lengths, boss 53 being integral with finger 51 and boss 54 being integral with finger 52. The upper surfaces of bosses 53 and 54 are in rigid contact with the lower surface of pressure member 45, so that fingers 51 and 52 are rigidly attached to pressure member 45. The lower surfaces of fingers 51 and 52 are adapted to directly contact rubber body 39; it will therefore be apparent that mechanical movements of plates 31 and 33 will be applied, through rods 41 and 43, pressure member 45, and fingers 51—52, to body 39.

Each of the two vibrating systems, comprising each group of fingers, the corresponding pressure member or members, the corresponding rods, the corresponding plates and the corresponding leaf spring, constitutes a mechanically resonant system having a certain natural mechanical resonant frequency, preferably in the supersonic range. The two vibrating systems are designed to have the same resonant frequency. If the driving coils are supplied with alternating current, they should be supplied from a source having a frequency which is half said mechanical resonant frequency, since the plates will be attracted to the cores once for each half-cycle of the source alternating voltage and will therefore be vibrated at twice the frequency of the source. In Fig. 4 is shown a diagram of the circuit used in the device of Figs. 2-3. At 55 is shown a two-phase alternating current generator, preferably of supersonic frequency, having a frequency which is half the resonant frequency of the vibrating systems. The two oppositely-disposed coils 26 and 28, associated with cores 16 and 18, respectively, are connected in series with each other across the output terminals 56 and 57 of one phase of the two-phase generator 55; the two oppositely-disposed coils 27 and 29, associated with cores 17 and 19, respectively, are connected in series with each other across the output terminals 58 and 59 of the other phase of said generator. It is thus seen that each pair of coils is supplied with a voltage which is 90° out of phase with that of the other pair.

In operation, when the coils 26-29 are energized with A. C. in the manner described, each time that the alternating voltage applied to coils 26 and 28 goes through either a positive or negative maximum, plates 30 and 32 will both be pulled upwardly, thereby moving rods 40 and 42, pressure members 46 and 47, and fingers 48, 49, and 50 upwardly also; when the voltage applied to coils 26 and 28 passes through zero, plates 30 and 32 will both be released, so that said plates, rods 40 and 42, pressure members 46 and 47, and fingers 48, 49, and 50 will all be moved downwardly by the action of leaf spring 34. Similarly, each time that the alternating voltage applied to coils 27 and 29 goes through either a positive or negative maximum, plates 31 and 33 will both be pulled upwardly, thereby moving rods 41 and 43, pressure member 45, and fingers 51 and 52 upwardly also; when the voltage applied to coils 27 and 29 passes through zero, plates 31 and 33 will both be released, so that said plates, rods 41 and 43, pressure member 45, and fingers 51 and 52 will all be moved downwardly by the action of leaf spring 35. Since the voltage applied to the coils 26 and 28 is 90° out of phase with that applied to coils 27 and 29, one voltage will be zero when the other is a maximum in either the positive or negative directions, so that fingers 48-50 will be moved downwardly when fingers 51—52 are moved upwardly, and vice versa. Since fingers 51 and 52 are positioned adjacent to, and between, fingers 48-50, the body of uncured rubber 39, which has a putty-like or dough-like consistency, will be forced to flow alternately back and forth laterally and vertically between members 48, 49, and 50 and between members 51 and 52.

This out-of-phase motion of the interleaved groups of fingers 48-50, and 51—52, will provide an effective kneading or mechanical manipulation of dough-like mass or body 39. As with the apparatus of Fig. 1, the body of uncured or unvulcanized rubber to be heated will be alternately compressed and released, and since body 39 is not resilient, a large proportion of the mechanical energy applied to said body is absorbed thereby, being converted to heat in said body, causing its temperature to rise to curing temperature. As body 39 is repeatedly kneaded in the manner described above, its temperature rises, and the rubber of said body becomes vulcanized or cured. As in Fig. 1, the uncured or unvulcanized regions of the rubber body are selectively and beneficially heated, because of the higher mechanical energy losses in the non-resilient uncured regions of the body. As a result, all of the mass or body 39 will be heated, thereby being vulcanized or cured, while at the same time the outer portions of said body will not be overheated, since as they become cured they become resilient, thereby transferring energy through such portions to the remaining uncured portions.

Although fingers 48-52 are shown as having planar lower surfaces, they may be made of any shape desired which is found suitable for effective kneading.

Although two sets of driven members are shown in the device of Figs. 2-4, it is possible to eliminate one pair of driving coils, such as coils 27 and 29, for example, in which case members 31 and 33, and therefore fingers 51 and 52, would not be positively driven but would be only resiliently maintained in position by means of spring 35. In this case, the single driven set of fingers 48-50 is interspersed between the second resiliently-mounted set 51—52, so the kneading action is effected by utilizing spring-mounted fingers interspersed between force-driven fingers. When the force-driven fingers 48-50 are drawn upwardly by the energization of coils 26 and 28, the spring-driven fingers 51—52 force the rubber 39 down and under the force-driven fingers 48-50; when the force-driven fingers 48-50 are pushed downwardly by the action of spring 34, the rubber 39 will be forced down and under the fingers 51—52, thereby causing said latter fingers to rise against the opposing force of spring 35. In the above-described manner, the desired kneading action is obtained.

Although only magnetostrictive and magnetic vibrating means are shown, it will be appreciated that any other suitable electromechanical driving means, such as a piezoelectric crystal vibrator, may be used for heating the uncured rubber body without departing from the scope of this invention.

The teachings of this invention are applicable to materials or substances, other than uncured rubber, which have a plastic, putty-like, or dough-like consistency. The temperature of materials which have such a consistency may be readily and effectively raised by the application thereto of mechanical vibrations, as taught by this invention. Also, it is entirely possible to use the Fig. 2 device for heating liquids, and in this case the liquid to be heated would be made to flow back and forth under the out-of-phase sets of fingers, in the same manner explained above for rubber mass or body 39.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. Apparatus for heating a body of plastic material, comprising a plurality of spaced members adapted to be placed in firm contact with said body, separate electrically-operated driving means for causing periodic vibrations of each of said members, and means for supplying each of said separate driving means from a different phase of a polyphase alternating current source.

2. Apparatus for heating a body of plastic material, comprising a pair of spaced members adapted to be placed closely adjacent each other and in firm contact with adjacent portions of a surface of said body, a pair of electrically-operated driving means, each one of said pair of driving means causing periodic vibrations of an associated one of said pair of members, and means for supplying each one of said pair of driving means from a different phase of a two-phase alternating current source of supersonic frequency.

3. Apparatus for heating a body of uncured rubber, comprising a pair of spaced members adapted to be placed closely adjacent each other and in firm contact with adjacent portions of a surface of said body, each of said members having a plurality of spaced fingers in contact with said body, the fingers of one of said pair being interposed between the fingers of the other of said pair, a pair of electrically-operated driving means, each one of said pair of driving means causing periodic vibrations of an associated one of said pair of members, and means for supplying each one of said pair of driving means from a different phase of a two-phase alternating current source.

4. The method of heating a body of uncured rubber, which comprises placing in contact therewith a pair of spaced members adapted to be periodically vibrated, and causing periodic out-of-phase vibrations of said two members.

5. The method of bonding a body of uncured rubber to a body of cured rubber comprising subjecting said bodies to mechanical vibrations whereby said uncured rubber is heated and said cured rubber remains substantially unheated.

6. The method of bonding a body of uncured rubber to a body of cured rubber comprising subjecting said bodies to supersonic mechanical vibrations whereby said uncured rubber is heated and said cured rubber remains substantially unheated.

JOHN W. DAWSON.

REFERENCES CITED

The following references are of record in the file of this patent:

UNITED STATES PATENTS

| Number | Name | Date |
|---|---|---|
| 797,847 | Gilroy | Aug. 22, 1905 |
| 1,566,500 | Northrup | Dec. 22, 1925 |
| 1,804,838 | Meissner | May 12, 1931 |
| 1,939,712 | Mahoux | Dec. 19, 1933 |
| 1,966,446 | Hayes | July 17, 1934 |
| 2,163,650 | Weaver | June 27, 1939 |
| 2,261,847 | Dufour et al. | Nov. 4, 1941 |
| 2,344,754 | Vang | Mar. 21, 1944 |
| 2,397,400 | Barwich | Mar. 26, 1946 |
| 2,403,301 | Richon | July 2, 1946 |
| 2,415,449 | Sverdrup et al. | Feb. 11, 1947 |

FOREIGN PATENTS

| Number | Country | Date |
|---|---|---|
| 848,467 | France | July 24, 1939 |

OTHER REFERENCES

Scientific American, vol. 162, March, April, 1940, pages 143 and 216.

Alexander; Colloid Chemistry, vol. 5, pp. 367, 368, and 369.